3,186,965
VINYL SULFIDE ORGANOSILICON COMPOUNDS
Edwin P. Plueddemann, Midland, Mich., assignor to The Dow Corning Corporation, Midland, Mich., a corporation of Michigan
No Drawing. Filed Feb. 28, 1962, Ser. No. 176,405
7 Claims. (Cl. 260—46.5)

This invention relates to organosilicon compounds containing the —SCH=CH$_2$ group attached to silicon through a silicon-carbon linkage.

It is the object of this invention to provide novel organosilicon compounds in which the characteristic functional group is a vinyl sulfide group which is attached to silicon through a linkage which is not hydrolyzable under normal conditions. In other words, this functional group is not attached to silicon through a sulfur-silicon bond or through a carbon-oxygen silicon bond. Another object is to provide reactive organosilicon compounds which are useful as finishes for siliceous materials in order to increase the wet bond strength between the siliceous material and organic resins. Another object is to provide functional organosilicon compounds which can be readily copolymerized with unsaturated organic resins to form copolymers useful as coatings and as laminating resins. Other objects and advantages will be apparent from the following description.

This invention relates to silanes of the formula

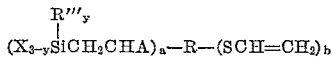

in which X is selected from the group, halogen atoms or radicals of the formula R'(OCH$_2$CH$_2$)$_n$O— in which R' is an aliphatic hydrocarbon radical of less than 5 carbon atoms or a

radical where R'' is an aliphatic hydrocarbon radical of less than 5 carbon atoms and $n$ has a value of from 0 to 2, R is a radical having a valence of $a+b$ and is attached to the S through a C—S bond and contains at least one carbon atom, the remaining atoms in R being of the group H and O atoms, the latter being in a configuration of the group OH,

and ether linkages there being no more than one ether linkage attached to any one carbon atom, A is a hydrogen atom or a methyl radical, $a$ and $b$ both have values from 1 to 3 inclusive, the sum of $a+b$ being from 2 to 4 inclusive, R''' is a monovalent hydrocarbon radical or a monovalent halohydrocarbon radical both being free of aliphatic unsaturation and $y$ has a value from 0 to 2 inclusive.

The compositions of this invention can be prepared by several basic reactions. One of these comprises reacting a silane of the formula

with compositions of the formula

in the presence of catalyst such as chloroplatinic acid or platinum-on-charcoal or platinum-on-alumina. The reaction is carried out under the standard conditions for adding SiH to C=C groups. In the present case, the SiH adds preferentially to the unsaturated group which is spaced by at least one carbon atom from the sulfur in preference to adding to the vinyl group attached directly to the sulfur.

A second basic method of preparing the silanes of this invention comprises reacting epoxy silanes of the formula

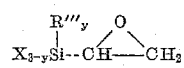

with alcohols or carboxylic acids of the formula

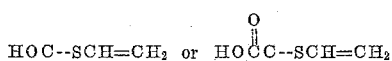

This reaction proceeds under the normal conditions for effecting reaction between an epoxide group and a hydroxyl or a carboxyl group. Suitable catalysts include amines. In carrying out this type of reaction, one should employ silanes in which X is unreactive to hydroxyl groups. Thus X should not be halogen.

The third basic reaction for preparing the compositions of this invention involves reacting an epoxy-silane of the formula

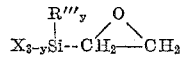

and an epoxy sulfide of the formula

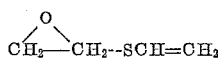

with an alcohol having from 2 to 4 hydroxy groups. Specifically, this includes reacting these materials with diols, triols or tetraols. In carrying out this reaction, the epoxide groups of both the silane and sulfide react with the hydroxyl groups of the alcohol, thereby linking the two together. This reaction is particularly advantageous for preparing compositions in which $a$ or $b$ both have a value greater than 1. The reaction proceeds under the normal conditions for reacting epoxides with alcohols.

This invention also relates to siloxanes which contain at least one siloxane unit of the formula

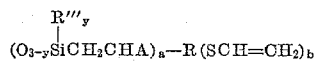

in which $y$, R''', A, $a$, R and $b$ are as above defined, any remaining siloxane units in said siloxane being of the formula

in which Z is a monovalent hydrocarbon radical or a monovalent halo-hydrocarbon radical and $c$ has a value from 0 to 3.

These siloxanes can be prepared by two basic methods; namely, by hydrolysis of the corresponding silanes above disclosed or by cohydrolysis of the above defined silanes with silanes of the formula Z$_c$SiX$_{4-c}$. These hydrolyses and condensations can be carried out in the normal manner for hydrolyzing silanes.

In addition, the siloxanes of this invention can be prepared directly by any of the three basic methods shown above. In this case, one would start out with a siloxane containing silicon-bonded hydrogen or having silicon-bonded epoxy groups attached to at least one of the silicon atoms.

As pointed out above, the compositions of this invention are useful for sizing siliceous materials. Of particular value for this use are the silanes of the formula $$(R'O)_3SiCH_2CHARSCH=CH_2$$

in which R' is an alkyl radical of less than three carbon atoms and R has no more than a total of 8 carbon plus oxygen atoms. The hydrolyzates of these silanes would be of the unit formula $O_{1.5}SiCH_2CHARSCH=CH_2$ where R has no more than a total of 8 carbon and oxygen atoms.

The compositions of this invention can be applied to the siliceous material in any convenient manner such as by dipping, brushing or spraying and these materials can be applied in any suitable form. That is, either the silanes or their hydrolyzates can be applied to the siliceous material. These materials can be applied in undiluted form or they can be applied dispersed in a solvent. When the silanes are applied to the siliceous material they react with the water adsorbed on the surface thereof or with hydroxyl groups on the surface to generate the corresponding siloxanes in situ.

Thus, this invention relates to siliceous materials having on the surface thereof siloxanes of the unit formula $$(O_{\frac{3-y}{2}}Si-CH_2CHA)_a-R(SCH=CH_2)_b$$
$$\overset{R'''_y}{|}$$

and preferably of the unit formula $$O_{\frac{3-y}{2}}SiCH_2CHARSCH=CH_2$$

where y, A, R''', R, a and b are as above defined.

One advantageous method of applying the compositions is from an aqueous solution. These are obtained by mixing the silanes with water usually under slightly acidic conditions whereupon the silane hydrolyzes and the corresponding silanols remain soluble in the water. It is not necessary, however, that the silanes or their hydrolyzates be water soluble, since they can be applied to the siliceous surface in other forms, such as in the form of solutions in organic solvents.

These compositions are particularly suitable for sizing any siliceous surface such as glass, silica, quartz, asbestos, silicates, mica or similar materials. The siliceous material can be in any form such as in the form of fibers, flakes or finely-divided granular material.

For the purpose of this invention, X can be any halogen atom, such as chlorine, bromine, fluorine or iodine, or any of the defined hydrocarbonoxy radicals. Specific examples of the latter type radicals within the scope of this invention are methoxy, ethoxy, isopropoxy, allyloxy, butoxy, formyloxy, acetoxy, propionyloxy, $$CH_3OCH_2CH_2O—$$

$$C_2H_5OCH_2CH_2OCH_2CH_2—, \quad C_4H_9OCH_2CH_2O—$$

$$CH_2=CHCOOCH_2CH_2O— \text{ and } CH_3COOCH_2CH_2O—$$

As can be seen from the above description, the R radical linking the vinyl sulfide group to the silicon must contain at least one carbon atom. R can be a hydrocarbon radical (e.g. composed entirely of C and H) or R can contain oxygen. For the purpose of this invention, R can be any hydrocarbon ether radical in which there is only one ether oxygen attached to any one carbon atom, or any hydroxylated hydrocarbon radical or R can be any hydrocarbon ester radical (e.g. containing the

group) or R can contain combinations of the various oxygenated groups. It is also evident that R can be divalent, trivalent or tetravalent.

For the purpose of this invention the configuration of R is not critical, thus the hydrocarbon portion of R can be aliphatic, cycloaliphatic or aromatic or combinations of these and R can contain aliphatic unsaturation between carbon atoms. Specific examples of R which are within the scope of this invention are

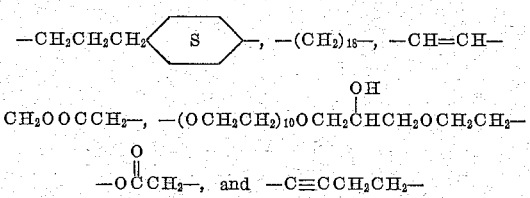

For the purpose of this invention, R''' can be any monovalent hydrocarbon radical free of aliphatic unsaturation such as alkyl radicals, such as methyl, ethyl, propyl or octadecyl; cycloaliphatic hydrocarbon radicals, such as cyclohexyl, cyclopropyl or cyclobutyl; aromatic hydrocarbon radicals such as phenyl, tolyl or xenyl and alkaryl hydrocarbon radicals such as benzyl, beta-phenylethyl or beta-phenylpropyl. R''' can also be any halogenated monovalent hydrocarbon radical free of aliphatic unsaturation such as 3,3,3-trifluoropropyl, chloromethyl, chlorophenyl, α,α,α-trifluorotolyl, dibromophenyl or chloroxenyl.

The compositions of this invention are also useful as coating compositions. For this purpose, they may be used alone or they can first be copolymerized with organic vinylic resins such as styrene, acrylates such as methylmethacrylate or butylacrylate, vinyl chloride, vinylidene chloride, acrylonitrile, allylcyanurate; polyester resins such as copolymers of maleic acid with ethylene glycol, butadiene, mixtures of butadiene and styrene and chloroprene.

The following examples are illustrative only and should not be construed as limiting the invention which is properly delinated in the appended claims.

EXAMPLE 1

10.4 g. of hydroxyethylvinyl sulfide was mixed with 23.4 g. of gamma-glycidoxypropyltrimethoxysilane and 8 drops of tris-2,4,6-dimethylaminomethylphenol as the catalyst. The mixture was heated 4 hours at 100° C. to obtain the product I,

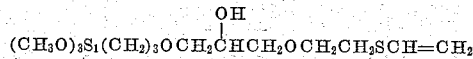

When this product is hydrolyzed in water at a pH of 6, a siloxane of the unit formula

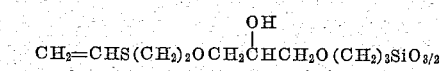

is obtained.

EXAMPLE 2

8 g. of

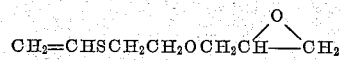

12 g. of gamma-glycidoxypropyltrimethoxysilane, 4 g. of trimethylolethane, 24 g. of dimethylformamide and 8 drops of the catalyst of Example 1 were mixed and heated at 70° C. for 16 hours. The product was an oily material having a viscosity of 50 cs. It was an equimolar mixture of compounds II

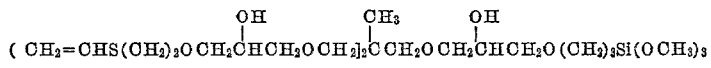

and the compound

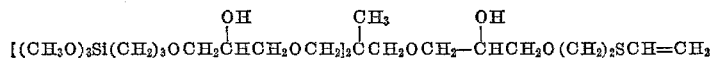

EXAMPLE 3

21 g. of $HOCH_2CH_2SCH=CH_2$, 12 g. of KOH, 25 g. of water and 40 g. of allylchloride were mixed and heated at reflux with rapid stirring until only a trace of KOH remained. The material was washed dry and distilled to give the compound $$CH_2=CHCH_2OCH_2CH_2SCH=CH_2$$

30 g. of this product was mixed with 25 g. of trimethoxysilane, 5 drops of 1 percent solution of chloroplatinic acid in the dimethylether of ethylene glycol and the mixture was refluxed for 16 hours. During the reflux, 10 drops more of the platinum solution was added. The reflux temperature rose from 110° to 168° C. The product was distilled to give the compound III $$(CH_3O)_3SiCH_2CH_2CH_2OCH_2CH_2SCH=CH_2$$

having a refractive index of 1.4658 at 25° C.

EXAMPLE 4

When trimethoxysilane is added to the following sulfides in accordance with the procedure of Example 3, the following silanes are obtained:

*Sulfide*

$CH_2=CHCH_2SCH=CH_2$
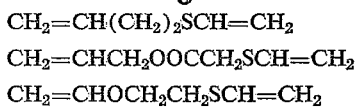

*Silane*

$(CH_3O)_3Si(CH_2)_3SCH=CH_2$
$(CH_3O)_3Si(CH_2)_4SCH=CH_2$
$(CH_3O)_3Si(CH_2)_3OOCCH_2SCH=CH_2$
$(CH_3O)_3Si(CH_2)_2OCH_2CH_2SCH=CH_2$

When the above silanes are hydrolyzed at a pH of 6, the following siloxanes of the following unit formulae respectively are obtained:

$O_{1.5}Si(CH_2)_3SCH=CH_2$
$O_{1.5}Si(CH_2)_4SCH=CH_2$
$O_{1.5}Si(CH_2)_3OOCCH_2SCH=CH_2$
$O_{1.5}Si(CH_2)_2OCH_2CH_2SCH=CH_2$

The above vinyl sulfides are prepared by reacting allyl mercaptan, butenyl mercaptan and allyl thioglycolate respectively with acetylene under pressure in the presence of sodium alcoholates and solvents by the method described in U.S. Patent 2,930,815.

EXAMPLE 5

When the following silanes are reacted with the following vinylsulfides in accordance with the procedure of Example 3, the following products are obtained.

| Silane | Vinyl sulfide | Product |
|---|---|---|
| $HSiCl_2$, $CH_3$ substituent | $CH_2=CH$⟨ring⟩$SCH=CH_2$ | (1) $Cl_2SiCH_2CH_2$⟨ring⟩$SCH=CH_2$, $CH_3$ substituent |
| $HSiF$, $C_{18}H_{37}$ and $CH_3$ substituents | $CH_2=CH$⟨S-ring⟩$SCH=CH_2$ | (2) $FSiCH_2CH_2$⟨S-ring⟩$SCH=CH_2$, $C_{18}H_{37}$ and $CH_3$ substituents |
| $HSi(OC_4H_9)_2$, Cl-phenyl | $CH_2=CH(CH_2)_{16}SCH=CH_2$ | (3) $(H_9C_4O)_2Si(CH_2)_{18}SCH=CH_2$, Cl-phenyl |
| $HSi(OCH_2CH_2OCH_3)_2$, $CH_2CH_2CF_3$ | $CH_2=CHCH_2OCH_2C{\equiv}CCH_2SCH=CH_2$ | (4) $(CH_3OCH_2CH_2O)_2Si(CH_2)_3OCH_2C{\equiv}CCH_2SCH=CH_2$, $CH_2CH_2CF_3$ |
| $(CH_3COO)_3SiH$ | $CH_2=CHCH_2SCH=CH_2$ | (5) $(CH_3COO)_3Si(CH_2)_3SCH=CH_2$ |
| $HSiOCH(CH_3)_2$, S-ring and $CH_3$-phenyl substituents | $CH_2=CHCHSCH=CH_2$, $CH_3$ | (6) $(CH_3)_2CHOSiCH_2CH_2CHSCH=CH_2$, $CH_3$; with S-ring and $CH_3$-phenyl |
| $HSiOOCC_2H_5$, $C_2H_5$ and $CF_3$-phenyl | $CH_2=CHCH_2OOCCH_2SCH=CH_2$ | (7) $C_2H_5COOSi(CH_2)_3OOCCH_2SCH=CH_2$, $C_2H_5$ and $CF_3$-phenyl |

| Silane | Vinyl sulfide | Product |
|---|---|---|
| HSi[O(CH₂CH₂O)₂OCCH₃]₂ | CH₂=CHCH₂CH₂SCH=CH₂ | (8) [CH₃CO(OCH₂CH₂O)₂]₂Si(CH₂)₄SCH=CH₂ (with dibromophenyl group) |
| HSi(OCH₂CH₂OC₃H₇)₂ with CH₂CH₂CH₂Cl | CH₂=CHCH₂SCH=CH₂ | (9) (H₇C₃OCH₂CH₂O)₂Si(CH₂)₃SCH=CH₂ with CH₂CH₂CH₂Cl |

EXAMPLE 6

When the products of Example 5 are hydrolyzed at a pH of at least 6, siloxanes having the following unit formulae respectively are obtained:

(1)  OSiCH₂CH₂⟨ ⟩SCH=CH₂ (CH₃ substituent)

(2)  O₀.₅SiCH₂CH₂⟨ S ⟩SCH=CH₂* (C₁₈H₃₇ and CH₃ substituents)

(3)  OSi(CH₂)₁₈SCH=CH₂ (with Cl-phenyl group)

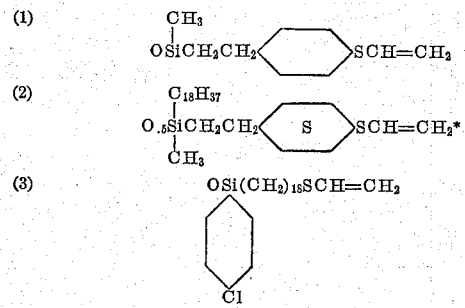

\* Hydrolysis carried out using a sodium bicarbonate solution.

(4)  OSi(CH₃)₃OCH₂C≡CCH₂SCH=CH₂ (CH₂CH₂CF₃ substituent)

(5)  O₁.₅Si(CH₂)₃SCH=CH₂

(6)  O₀.₅SiCH₂CH₂CHSCH=CH₂ (with S-phenyl-CH₃ and CH₃)

(7)  O₀.₅Si(CH₂)₃OOCCH₂SCH=CH₂ (C₂H₅ substituent)

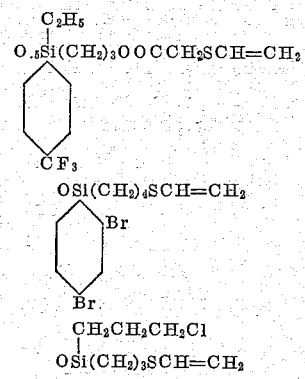

(8)  OSi(CH₂)₄SCH=CH₂ (CF₃ and Br substituents)

(9)  OSi(CH₂)₃SCH=CH₂ (CH₂CH₂CH₂Cl substituent, Br-phenyl)

EXAMPLE 7

When the following silanes are reacted with the following epoxides employing the catalysts and conditions of Example 2, the following products are obtained:

| Silane | Epoxide | Product |
|---|---|---|
| (CH₃COO)₂SiCH₂CHCOOH (with CH₃, CH₃ groups) | CH₂—CHCH₂O(CH₂)₂SCH=CH₂ (epoxide) | (CH₃COO)₂SiCH₂CHCOOCH₂CHCH₂O(CH₂)₂SCH=CH₂ (CH₃, CH₃, OH) |
| (CH₃O)₂Si(CH₂)₃OH with CH₂/CHCH₃ | CH₂CHCH₂O(CH₂)₂SCH=CH₂ (epoxide) | (CH₃O)₂Si(CH₂)₃OCH₂CHCH₂O(CH₂)₂SCH=CH₂ with OH, CH₂, CH—CH₃ |

When these silanes are hydrolyzed at a pH of at least 6 siloxanes having the following unit formulate are produced:

OSiCH₂CHCOOCH₂CHCH₂O(CH₂)₂SCH=CH₂ (CH₃, CH₃, OH)

OSi(CH₂)₃OCH₂CHCH₂O(CH₂)₂SCH=CH₂ (OH, CH₂, CH—CH₃)

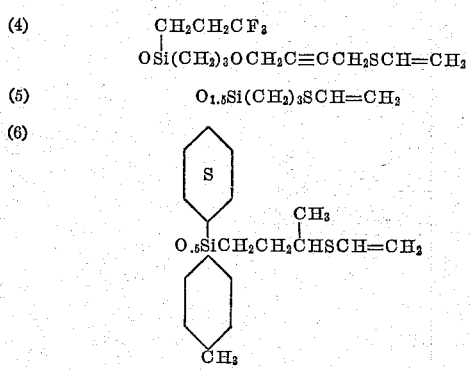
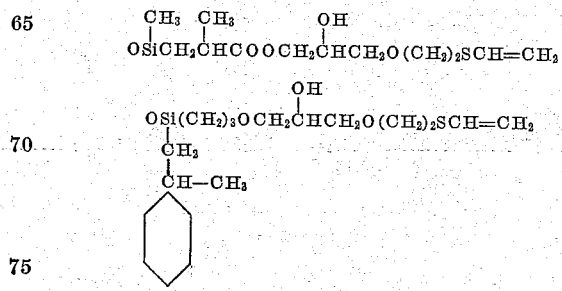

EXAMPLE 8

When the following siloxanes are reacted with the following vinylsulfides in accordance with the procedure of Example 3, the following products are obtained:

| Siloxane | Vinylsulfide | Product |
|---|---|---|
| $Si(OSiH\underset{Me_2}{\mid})_4$ | $CH_2=CHCH_2SCH=CH_2$ | $Si[OSi\underset{Me_2}{\mid}(CH_2)_3SCH=CH_2]_4$ |
| $C_6H_5Si(OSiH\underset{Me_2}{\mid})_3$ | $CH_2=CHCH_2SCH=CH_2$ | $C_6H_5Si[OSi\underset{Me_2}{\mid}(CH_2)_3SCH=CH_2]_3$ |
| $Me_3Si[OSi\underset{H}{\overset{Me}{\mid}}]_4OSiMe_3$ | $CH_2=CHCH_2SCH=CH_2$ | $Me_3Si\left[OSi\underset{(CH_2)_3SCH=CH_2}{\overset{Me}{\mid}}\right]_4 OSiMe_3$ |
| $C_{18}H_{37}Si\underset{Me_2}{\mid}O-Si\underset{Me_2}{\mid}H$ | $CH_2=CHCH_2SCH=CH_2$ | $C_{18}H_{37}Si\underset{Me_2}{\mid}O-Si\underset{Me_2}{\mid}(CH_2)_3SCH=CH_2$ |
| Copolymer of— | | Copolymer of— |
| 10 mol percent $C_6H_{11}SiO_{1.5}$ | $CH_2=CHCH_2SCH=CH_2$ | 10 mol percent $C_6H_{11}SiO_{1.5}$ |
| 20 mol percent $ClC_6H_4SiO_{1.5}$ | | 20 mol percent $ClC_6H_4SiO_{1.5}$ |
| 30 mol percent $ClCH_2CH_2CH_2Si\underset{\mid}{\overset{Me}{\mid}}O$ | | 30 mol percent $ClCH_2CH_2CH_2Si\underset{\mid}{\overset{Me}{\mid}}O$ |
| 30 mol percent $CF_3CH_2CH_2Si\underset{\mid}{\overset{Me}{\mid}}O$ | | 30 mol percent $CF_3CH_2CH_2Si\underset{\mid}{\overset{Me}{\mid}}O$ |
| 10 mol percent $MeHSiO$ | | 10 mol percent $CH_2=CHS(CH_2)_3Si\underset{\mid}{\overset{Me}{\mid}}O$ |
| 30 mol percent 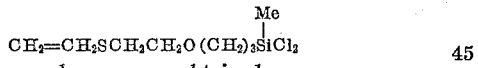$Si\underset{\mid}{\overset{Me}{\mid}}O$ | $CH_2=CHCH_2SCH=CH_2$ | 30 mol percent 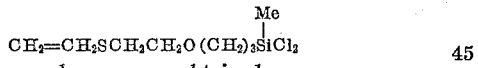$Si\underset{\mid}{\overset{Me}{\mid}}O$ |
| 30 mol percent $(C_2H_5)_2SiO$ | | 30 mol percent $(C_2H_5)_2SiO$ |
| 40 mol percent $MeHSiO$ | | 40 mol percent $CH_2=CHS(CH_2)_3Si\underset{\mid}{\overset{Me}{\mid}}O$ |

EXAMPLE 9

When the following silanes are each cohydrolyzed with $$CH_2=CH_2SCH_2CH_2O(CH_2)_3Si\overset{Me}{\underset{\mid}{}}Cl_2$$

the following copolymers are obtained:

| Mol percent | Silanes | Copolymer |
|---|---|---|
| 50 | $CH_2=CHSi\underset{\mid}{\overset{Me}{\mid}}Cl_2$ | 50 mol percent $CH_2=CHS\underset{\mid}{\overset{Me}{\mid}}iO$ |
| | | 50 mol percent $CH_2=CHS(CH_2)_2O(CH_2)_3S\underset{\mid}{\overset{Me}{\mid}}iO$ |
| 10 | 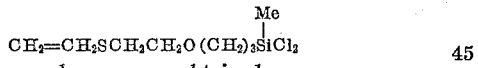$Si\underset{\mid}{\overset{Me}{\mid}}Cl_2$ | 10 mol percent 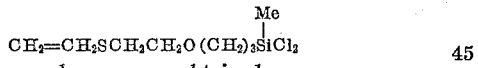$S\underset{\mid}{\overset{Me}{\mid}}iO$ |
| | | 90 mol percent $CH_2=CHS(CH_2)_2O(CH_2)_3S\underset{\mid}{\overset{Me}{\mid}}iO$ |
| 10 | $CF_2=CFSi\underset{\mid}{\overset{Me}{\mid}}Cl_2$ | 10 mol percent $CF_2=CFS\underset{\mid}{\overset{Me}{\mid}}iO$ |
| | | 90 mol percent $CH_2=CHS(CH_2)_2O(CH_2)_3S\underset{\mid}{\overset{Me}{\mid}}iO$ |
| 20 | $CH_2=CHCH=CHSi\underset{\mid}{\overset{Ph}{\mid}}Cl_2$ | 20 mol percent $CH_2=CHCH=CHS\underset{\mid}{\overset{Ph}{\mid}}iO$ |
| | | 80 mol percent $CH_2=CHS(CH_2)_2O(CH_2)_3S\underset{\mid}{\overset{Me}{\mid}}iO$ |
| 20 | $ClCH=CHCH_2CH_2Si\underset{\mid}{\overset{Me}{\mid}}Cl_2$ | 20 mol percent $ClCH=CHCH_2CH_2S\underset{\mid}{\overset{Me}{\mid}}iO$ |
| | | 80 mol percent $CH_2=CHS(CH_2)_2O(CH_2)_3S\underset{\mid}{\overset{Me}{\mid}}iO$ |

EXAMPLE 10

When one mol of

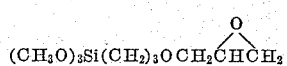
$$(CH_3O)_3Si(CH_2)_3OCH_2\overset{O}{\overset{\triangle}{CH}CH_2}$$

and one mol of

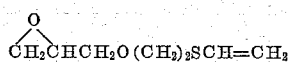
$$\overset{O}{\overset{\triangle}{CH_2CH}}CH_2O(CH_2)_2SCH=CH_2$$

are reacted with one mol of malonic acid in the presence of tris-2,4,6-dimethylaminomethylphenol as shown in Example 1, the product

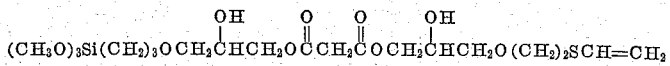
$$(CH_3O)_3Si(CH_2)_3OCH_2\overset{OH}{\underset{|}{C}H}CH_2O\overset{O}{\overset{\|}{C}}CH_2\overset{O}{\overset{\|}{C}}OCH_2\overset{OH}{\underset{|}{C}H}CH_2O(CH_2)_2SCH=CH_2$$

is obtained. When this product is hydrolyzed, the siloxane of the unit formula

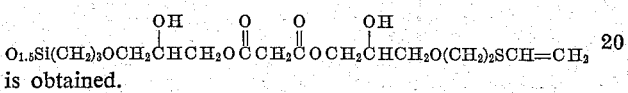
$$O_{1.5}Si(CH_2)_3OCH_2\overset{OH}{\underset{|}{C}H}CH_2O\overset{O}{\overset{\|}{C}}CH_2\overset{O}{\overset{\|}{C}}OCH_2\overset{OH}{\underset{|}{C}H}CH_2O(CH_2)_2SCH=CH_2$$

is obtained.

EXAMPLE 11

When two mols of

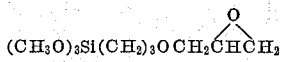
$$(CH_3O)_3Si(CH_2)_3OCH_2\overset{O}{\overset{\triangle}{CH}CH_2}$$

and 2 mols of

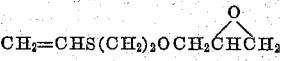
$$CH_2=CHS(CH_2)_2OCH_2\overset{O}{\overset{\triangle}{CH}CH_2}$$

are reacted with one mol of pentaerythritol in dimethylformamide solution and in the presence of the catalyst of Example 1, a mixture of compounds having the following formulae are obtained:

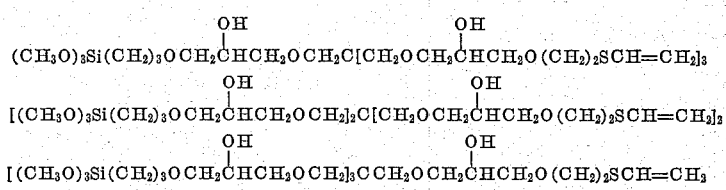
$$(CH_3O)_3Si(CH_2)_3OCH_2\overset{OH}{\underset{|}{C}H}CH_2OCH_2C[CH_2OCH_2\overset{OH}{\underset{|}{C}H}CH_2O(CH_2)_2SCH=CH_2]_3$$

$$[(CH_3O)_3Si(CH_2)_3OCH_2\overset{OH}{\underset{|}{C}H}CH_2OCH_2]_2C[CH_2OCH_2\overset{OH}{\underset{|}{C}H}CH_2O(CH_2)_2SCH=CH_2]_2$$

$$[(CH_3O)_3Si(CH_2)_3OCH_2\overset{OH}{\underset{|}{C}H}CH_2OCH_2]_3CCH_2OCH_2\overset{OH}{\underset{|}{C}H}CH_2O(CH_2)_2SCH=CH_2$$

When this mixture is hydrolyzed a resinous siloxane containing the following copolymerized units is obtained:

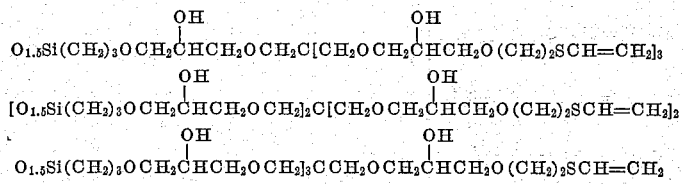
$$O_{1.5}Si(CH_2)_3OCH_2\overset{OH}{\underset{|}{C}H}CH_2OCH_2C[CH_2OCH_2\overset{OH}{\underset{|}{C}H}CH_2O(CH_2)_2SCH=CH_2]_3$$

$$[O_{1.5}Si(CH_2)_3OCH_2\overset{OH}{\underset{|}{C}H}CH_2OCH_2]_2C[CH_2OCH_2\overset{OH}{\underset{|}{C}H}CH_2O(CH_2)_2SCH=CH_2]_2$$

$$O_{1.5}Si(CH_2)_3OCH_2\overset{OH}{\underset{|}{C}H}CH_2OCH_2]_3CCH_2OCH_2\overset{OH}{\underset{|}{C}H}CH_2O(CH_2)_2SCH=CH_2$$

EXAMPLE 12

The compounds I, II and III of Examples 1, 2 and 3 were each applied to 181 glass cloth by dipping the cloth in the solutions shown in Table I below. The cloth was then dried in each case 7 minutes at 235° F. and the treated cloth was used to prepare laminates as follows:

14 plies of the treated cloth were laid up with the warp threads rotated at 90° in alternate plies and impregnated with a polyester resin. Each laminate was cured 30 minutes at 100° C. and 30 p.s.i. to form a molded sheet of about 120 mils and containing about 30 parts cured polyester resin.

The resin employed was a solution of 70 parts linear polyester in 30 parts of styrene monomer to which had been added 0.5 part benzoyl peroxide dissolved in about 7.5 parts styrene monomer. The linear polyester in this mixture was prepared by reacting equimolar proportions of phthalic acid and maleic acid with propylene glycol.

The 70 percent solution of this polyester in styrene had an acid number of about 35.

Each laminate was tested for flexural strength in accordance with U.S. Federal Specification L-P 406b–Method 1031 and the compressive strength in accordance with Method 1021 of that Specification. The flexural and compressive strengths were also determined in like manner after a sample of each laminate had been boiled in water for 2 hours and then wiped dry. Results from the latter test are referred to in the table below as the "2 Hr. Boil." The 2 hr. Boil Flexural Strength times 100 divided by the strength of the laminate as molded is the "Percent Retention."

*Table 1*

| Composition | Applied as percent by wt. | Flexural strength in p.s.i. | | Compressive strength in p.s.i. | | Percent retention |
|---|---|---|---|---|---|---|
| | | Dry | 2 hr. boil | Dry | 2 hr. boil | |
| I | .5% in methanol | 80,100 | 72,100 | 44,900 | 37,100 | 90 |
| II | .5% in water containing .1% acetic acid. | 77,500 | 71,000 | 48,000 | 38,700 | 92 |
| III | .5% in a mixture of 3 parts by wt. water and 1 part by wt. isopropanol. | 72,400 | 68,700 | 42,000 | 30,100 | 93.5 |

That which is claimed is:
1. A composition of the formula

$$(X_{3-y}\overset{R'''_y}{\underset{|}{Si}}CH_2CHA)_a-R-(SCH=CH_2)_b$$

in which

X is selected from the group consisting of halogen atoms and radicals of the formula $$R'(OCH_2CH_2)_nO-$$

in which

R' is selected from the group consisting of aliphatic hydrocarbon radicals of less than 5 carbon atoms and radicals of the formula $$\underset{R''C-}{\overset{O}{\|}}$$

in which R'' is an aliphatic hydrocarbon radical of less than 5 carbon atoms and $n$ has a value from 0 to 2 inclusive, R is a radical having a valence of $a+b$ and being attached to the S through a C—S bond and containing at least one carbon atom, the remaining atoms in R being selected from the group consisting of H and O atoms, the latter being in a configuration selected from the group consisting of —OH, $$\underset{-CO-}{\overset{O}{\|}}$$

and ether linkages, there being no more than one ether linkage attached to any one carbon atom, A is selected from the group consisting of H atoms and methyl radicals, $a$ and $b$ both having values from 1 to 3 inclusive, the sum of $a+b$ being from 2 to 4 inclusive, R''' is selected from the group consisting of monovalent hydrocarbon radicals and monovalent halohydrocarbon radicals both being free of aliphatic unsaturation, and $y$ has a value from 0 to 2 inclusive.

2. A silane of the formula $(R'O)_3SiRSCH=CH_2$ in which R' is an alkyl radical of less than 3 carbon atoms and in which R is a divalent hydrocarbon radical of from 3 to 10 inclusive carbon atoms.

3. A silane of the formula $$(CH_3O)_3Si(CH_2)_3SCH=CH_2$$

4. A siloxane containing at least one unit of formula $$(O_{\frac{3-y}{2}}\overset{R'''_y}{\underset{|}{Si}}CH_2CHA)_aR(SCH=CH_2)_b$$

in which

R is a radical having a valance of $a+b$ and is attached to the S through a carbon sulfur bond and contains at least one carbon atom, the remaining atoms in R being selected from the group consisting of H and O atoms the latter being in a configuration selected from the group consisting of —OH, $$\underset{-CO-}{\overset{O}{\|}}$$

and ether linkages, there being no more than one ether linkage per carbon atom,

A is selected from the group consisting of H atoms and methyl radicals, $a$ and $b$ both having values from 1 to 3 inclusive, the sum of $a+b$ being from 2 to 4 inclusive, R''' is selected from the group consisting of monovalent hydrocarbon radicals and halogenated monovalent hydrocarbon radicals, both being free of aliphatic unsaturation and $y$ has a value from 0 to 2 inclusive, any remaining siloxane units in said siloxane being of the formula $$Z_cSiO_{\frac{4-c}{2}}$$

in which

Z is selected from the group consisting of monovalent hydrocarbon radicals and monovalent halohydrocarbon radicals, and $c$ has a value from 0 to 3 inclusive.

5. An article of manufacture comprising a siliceous material coated with a siloxane of the unit formula $$(O_{\frac{3-y}{2}}\overset{R'''_y}{\underset{|}{Si}}CH_2CHA)_a-R-(SCH=CH_2)_b$$

in which

R''' is selected from the group consisting of monovalent hydrocarbon radicals and monovalent halohydrocarbon radicals both being free of aliphatic unsaturation, $y$ has a value from 0 to 2 inclusive, A is selected from the group consisting of hydrogen atoms and methyl radicals, $a$ and $b$ both have values from 1 to 3 inclusive, the sum of $a+b$ being from 2 to 4 inclusive, and R is a radical having a valence of $a+b$ and being attached to the sulphur through a carbon-sulphur bond and containing at least one carbon atom, the remaining atoms in R being selected from the group consisting of hydrogen and oxygen atoms, the latter being in a configuration selected from the group consisting of —OH, $$\underset{-CO-}{\overset{O}{\|}}$$

and ether linkages, there being no more than one ether linkage attached to any one carbon atom.

6. An article in accordance with claim 5 in which $y$ has a value of 0, $a$ and $b$ are both equal to 1 and R has a total of no more than 8 carbon and oxygen atoms.

7. An article of manufacture comprising a siliceous article coated with a siloxane of the unit formula $$CH_2=CHS(CH_2)_3SiO_{1.5}$$

References Cited by the Examiner

UNITED STATES PATENTS

| | | | |
|---|---|---|---|
| 2,721,873 | 10/55 | MacKenzie | 260—46.5 |
| 2,763,629 | 9/56 | Gottfurcht | 260—46.5 |
| 2,834,748 | 5/58 | Jellinek | 260—46.5 |
| 2,865,884 | 12/58 | Benneville et al. | 260—46.5 |
| 2,960,492 | 11/60 | Morton et al. | 260—448.2 |
| 3,078,292 | 2/63 | Prober | 260—448.2 |

OTHER REFERENCES

Organosilicon Compounds (Eaborn), published by Academic Press (New York), 1960, page 290 relied upon.

MURRAY TILLMAN, *Primary Examiner*.

J. R. LIBERMAN, *Examiner*.